United States Patent
Manchanda et al.

(10) Patent No.: US 9,543,758 B1
(45) Date of Patent: Jan. 10, 2017

(54) ADAPTIVE BATTERY POWER DISTRIBUTION TO REMOTE RADIO HEADS IN LONG TERM EVOLUTION (LTE) NETWORKS

(71) Applicant: Sprint Communications Company L.P., Overland Park, KS (US)

(72) Inventors: Nitesh Manchanda, Overland Park, KS (US); Sreekar Marupaduga, Overland Park, KS (US); Sharath Somashekar, Overland Park, KS (US); Eugene S. Mitchell, Jr., Blue Springs, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 537 days.

(21) Appl. No.: 14/088,078

(22) Filed: Nov. 22, 2013

(51) Int. Cl.
*H02J 1/00* (2006.01)
*H02J 3/14* (2006.01)

(52) U.S. Cl.
CPC ..................... *H02J 1/00* (2013.01)

(58) Field of Classification Search
CPC .............. H02J 4/00; H02J 3/14; H02J 3/00; H02J 2003/143; H02J 1/14; H02J 7/35; H02J 3/383; H02J 13/0062; H02J 13/0075; H02J 1/00; H02J 1/08; H02J 3/32; H02J 5/005; H02J 7/0021; H02J 7/0063
USPC .......................................................... 307/38
See application file for complete search history.

(56) References Cited

U.S. PATENT DOCUMENTS

| | | | | |
|---|---|---|---|---|
| 5,844,327 A | * | 12/1998 | Batson | H02J 3/38 307/23 |
| 6,731,693 B1 | * | 5/2004 | Damgaard | H04L 27/206 331/127 |
| 6,878,821 B2 | * | 4/2005 | Bernardelli | C07B 41/02 540/570 |
| 7,242,104 B1 | * | 7/2007 | Johnson | H02J 1/12 290/1 A |
| 8,532,265 B2 | * | 9/2013 | Wright | H05K 7/20945 361/28 |
| 8,942,176 B2 | * | 1/2015 | Sumasu | H04J 11/005 370/328 |
| 9,281,866 B2 | * | 3/2016 | Smentek | H04B 3/44 |
| 2002/0153776 A1 | * | 10/2002 | Elliott | B64D 11/0015 307/38 |
| 2012/0025616 A1 | * | 2/2012 | Hock | H02J 9/061 307/66 |
| 2013/0294738 A1 | * | 11/2013 | Simmons | G02B 6/4439 385/135 |
| 2014/0055898 A1 | * | 2/2014 | Kostakis | H02H 3/20 361/91.5 |

* cited by examiner

*Primary Examiner* — Jared Fureman
*Assistant Examiner* — Esayas Yeshaw

(57) ABSTRACT

A method and system are provided for adjusting power distribution to remote radio heads in a telecommunication network. Multiple buses are implemented in a configuration to individually distribute power to remote radio heads. Each bus is connected to a remote radio heads allowing the remote radio head to receive power on an individual basis and different from other remote radio heads. An eNodeB collects operational measurements from a cell site which are used to provide instructions to adjust the power to each bus and corresponding remote radio head.

17 Claims, 5 Drawing Sheets

ADAPTIVE BATTERY POWER DISTRIBUTION TO REMOTE RADIO HEADS IN LONG TERM EVOLUTION (LTE) NETWORKS

CROSS-REFERENCE TO RELATED APPLICATIONS

Not applicable.

BACKGROUND OF THE INVENTION

In the telecommunications environment in wireless networks, the average backup power is typically restricted to four (4) hours to be shared among equipment. This limited amount of time leaves no options for load shedding or distributing load to equipment that needs power the most. Currently, power is allocated equally through battery strings to remote radio heads (RRHs). Backup systems use a single direct current (DC) bus for power distribution to the remote radio heads. Equal power distribution is inefficient and causes a shortage in battery backup time for radios with higher capacity. Therefore, a solution is needed that would allow power to be distributed variably.

SUMMARY

Embodiments of the invention are defined by the claims below, not this summary. A high-level overview of various aspects of embodiments of the invention is provided here for that reason, to provide an overview of the disclosure and to introduce a selection of concepts that are further described below in the detailed description section. This summary is not intended to identify key features or essential features of the claimed subject matter, nor is it intended to be used as an aid in isolation to determine the scope of the claimed subject matter.

Embodiments of the present invention relate generally to an adaptive allocation of battery backup power between remote radio heads by using multiple DC buses to enable variable power distribution. A feedback mechanism is incorporated to consider the existing battery backup power for each remote radio head and consider user equipment (i.e. mobile device) activity to decide on power requirement. With variable power distribution, radios having low battery backup, and a higher number of mobile devices can be dynamically assigned more battery capacity.

BRIEF DESCRIPTION OF THE SEVERAL VIEWS OF THE DRAWINGS

Illustrative embodiments of the present invention are described in detail below with reference to the included drawing figures, wherein.

DETAILED DESCRIPTION

Embodiments of the present invention relate generally to a method and system for adjusting power distribution to remote radio heads in a telecommunication network. Multiple power buses are incorporated to allow a variable power distribution to be provided to network elements. The power is changed based on a feedback mechanism that monitors power levels and power requirements. As the power needs change, signals can be sent from a network device such as an evolved node B (eNodeB) adjusting the power distribution to one or several buses causing a power change to one or several remote radio heads.

In a first aspect, a method for adjusting power distribution to remote radio heads in a telecommunication network is provided that includes connecting each unique power bus to each remote radio head. Each remote radio head transmits in a sector in a cell site and is a member of a group of remote radio heads assigned to the cell site. Each unique power bus is a member of a group of power buses. The group of power buses is connected to a power distribution unit. Direct current (DC) power is received into the group of power buses. The DC power is changed to each unique power bus. Each unique power bus is respectively connected to each remote radio head. The DC power provided to a first remote radio head is different from the DC power provided to a second remote radio head.

In another aspect, a system for adjusting power distribution to remote radio heads in a telecommunication network is provided that includes a power distribution unit that operates to receive direct current (DC) power from a set of batteries or rectifier when there is a loss of alternating current (AC) power. The power distribution unit transmits the DC power to a set of power buses. Each power bus is connected to a unique remote radio head. A set of remote radio heads are assigned to a cell site and each remote radio head covers a cell site sector for wireless transmission. The power distribution unit individually alters a portion of the DC power to each power bus in the set of power buses and causes a change in the portion of the DC power received at each unique remote radio head.

Figure 1:
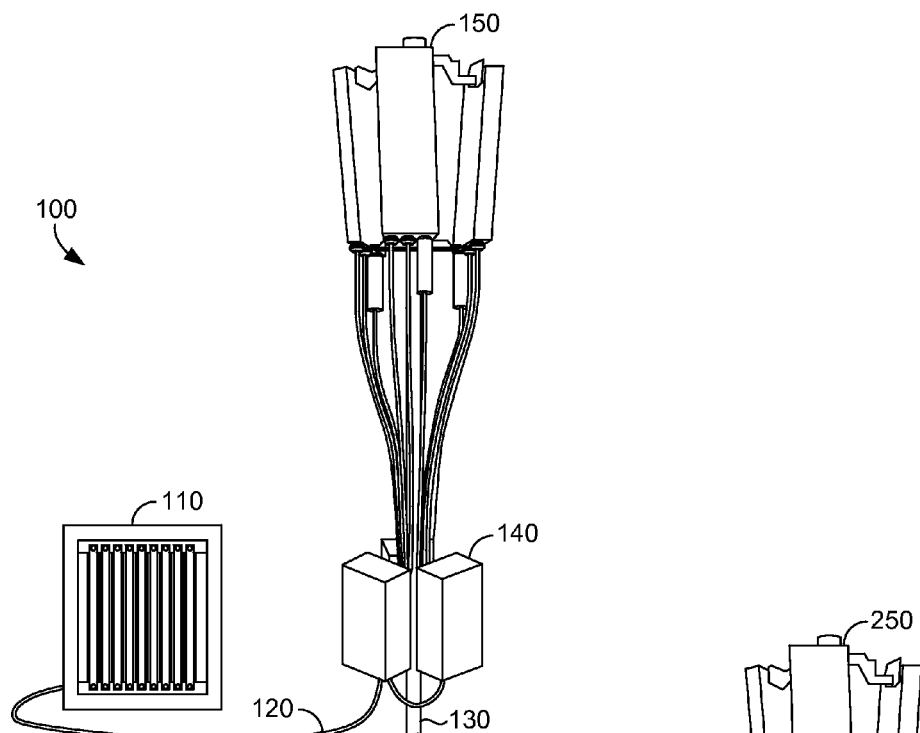
FIG. 1 is an exemplary cell site implemented in accordance with an embodiment of the present invention.

In FIG. 1, a cell site 100 is shown with an eNodeB 110 connected to cell equipment, which is found in a wireless telecommunications environment. eNodeB 110 connects to the cell equipment with cable 120, which can be a cable that complies with the common public radio interface (CPRI) specification. Cable 120, which can be a fiber optic cable or other type of cable, extends from eNodeB 110 to various components that are attached to a tower 130. In this configuration, the components on tower 130 include a radio head 140 and an antenna 150. As shown in FIG. 1, several radio heads, such as radio head 140, are attached to tower 130. Several antennas, such as antenna 150, are also attached to tower 130. The radio heads extend the range of the eNodeB or other similar devices. In certain configurations, radio head 140 may be known as a remote radio head and can be located as shown in FIG. 1 or located closer to antenna 150. Several antennas, like antenna 150, are located on tower 130 in such a configuration so as to provide a 360 degree coverage for communicating with users through a wireless transmission within the range of the cell. As one of ordinary skill in the art knows, wireless users or subscribers are provided voice and data services between their mobile devices and the components in FIG. 1.

Figure 2:
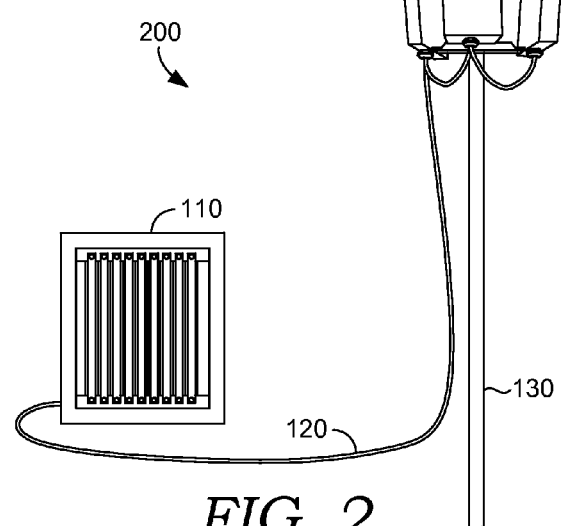
FIG. 2 is another exemplary cell site implemented in accordance with an embodiment of the present invention.

In FIG. 2, a cell site 200 is shown with eNodeB 110 connected to cell equipment. Cell site 200 functions similar to cells site 110. However, cell site 200 shows a different configuration with eNodeB 110 connecting through a cable 120 to a set of antennas 250. Antenna 250 is attached to tower 130, which is similar to tower 130 in FIG. 1. Through the advancement of technology, antenna 250 is indicative of an active antenna while antenna 150 is indicative of a passive antenna. Hence, less equipment is required between antenna 250 and eNodeB 110, allowing the functionality of radio head 140 to be embedded and hidden into antenna 250.

FIGS. 1 and 2 provide illustrations of exemplary cell sites that can be deployed in a wireless telecommunications environment. Each radio head eventually connects to an antenna allowing for a transmission of wireless signals over a region. Typically, each antenna allows for the remote radio head to transmit in an area called a sector.

Figure 3A:
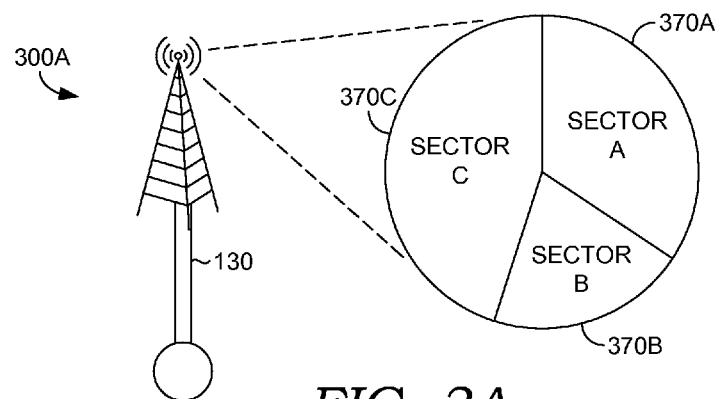
FIG. 3A is an exemplary diagram illustrating a cell site transmission coverage, implemented in accordance with an embodiment of the present invention.

Turning now to FIG. 3A, an exemplary cell site 300A is shown with an illustration of a wireless transmission coverage. As shown before, tower 130 has a number of equipment connected to it and primarily includes antennas to transmit wireless signals between mobile devices and other devices in a wireless network. FIG. 3A shows that a cell site can have a wireless transmission coverage that is separated into sectors. These sectors define the wireless coverage that can occur at the cell site. The number of sectors can vary among cell sites. However, the cell site may ordinarily have three sectors to have a 360 degree wireless transmission coverage. The number of sectors can be set based on the number of antennas or the number of remote radio heads. As one can see, the number of sectors might vary depending on implementation. For example, a cell site might only have two sectors for wireless transmission coverage, or might have four or more sectors depending on need. Just as the number of sectors can vary, the number of remote radio heads might vary as well. Similarly, the size of the sector can vary depending on the power output provided to the cell site. In FIG. 3A, sectors 370A, 370B, and 370C are shown, which would provide wireless transmission coverage for any mobile device located within the sectors. However, as one can see, the size of the sectors can vary in radius as well as among each other depending on implementation by a service provider.

Figure 3B:
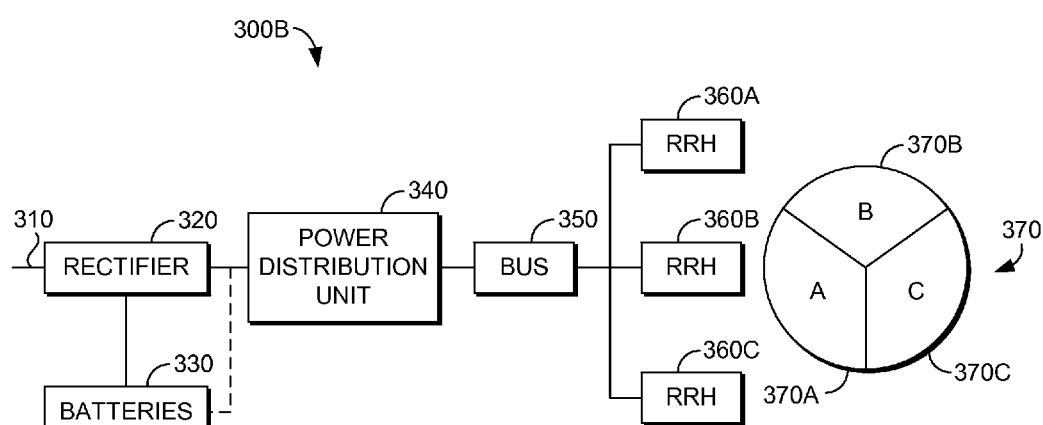
FIG. 3B is an exemplary block diagram illustrating power distribution among wireless network elements.

In FIG. 3B, an exemplary block diagram illustrating power distribution among wireless network elements is shown in a network 300B. One could consider that network 300B is an expanded view of cell site 300A with additional elements. Network 300B shows a typical cell site that is connected to network devices such as an eNodeB, nodeB, or base transceiver station (BTS). More particularly, network 300B shows an ordinary power flow from the source through to the cell site. Network 300B is configured where alternating current (AC) power 310 flows into a rectifier 320. Rectifier 320 allows AC power 310 to be converted to DC power. In addition, rectifier 320 allows for a smooth transition to battery backup power with batteries 330 when AC power 310 is lost or removed. DC power will flow into power distribution unit 340. From power distribution unit 340, the DC power flows into a bus 350, which distributes the power equally to remote radio heads (RRHs) 360A, 360B, and 360C. Note: The illustration in network 300B is one example how a service provider might implement elements for power distribution. Other configurations can be implemented with elements in different setups.

In many configurations, the battery backup unit such as batteries 330 is configured with four battery strings and usually allow for four (4) hours of battery backup when AC power 310 is lost. These batteries provide 48 volts, and in some old systems, provide 24 volts. Likewise, in most situations, RRHs 360A, 360B, and 360C are the most power consuming devices in the cell site because RRHs 360A, 360B, and 360C are the most critical elements. They are responsible for the processing of signals during wireless transmissions. In most configurations, there is only one bus 350, which is involved in the distribution of power to RRHs 360A, 360B, and 360C. Note: Although power distribution unit 340 and bus 350 are shown as separate elements, in alternative embodiments, these two elements may be combined into one element or device. As a result, this single bus 350 is responsible for providing all the power to the remote radio heads.

Based on the power received at RRHs 360A, 360B, and 360C, cell site 370 shows a wireless transmission coverage indicated by sectors 370A, 370B, and 370C. Each remote radio head corresponds to each sector. As the power is distributed from bus 350 to RRHs 360A, 360B, and 360C, a typical cell site 370 might show an even distribution of wireless coverage among sectors 370A, 370B, and 370C based on the power output at RRHs 360A, 360B, and 360C. As shown in FIG. 3B, cell site 370 shows a substantially even distribution of wireless coverage among the sectors. This usually indicates an even distribution of power distributed to RRHs 360A, 360B, and 360C from the single bus 350.

Figure 4:
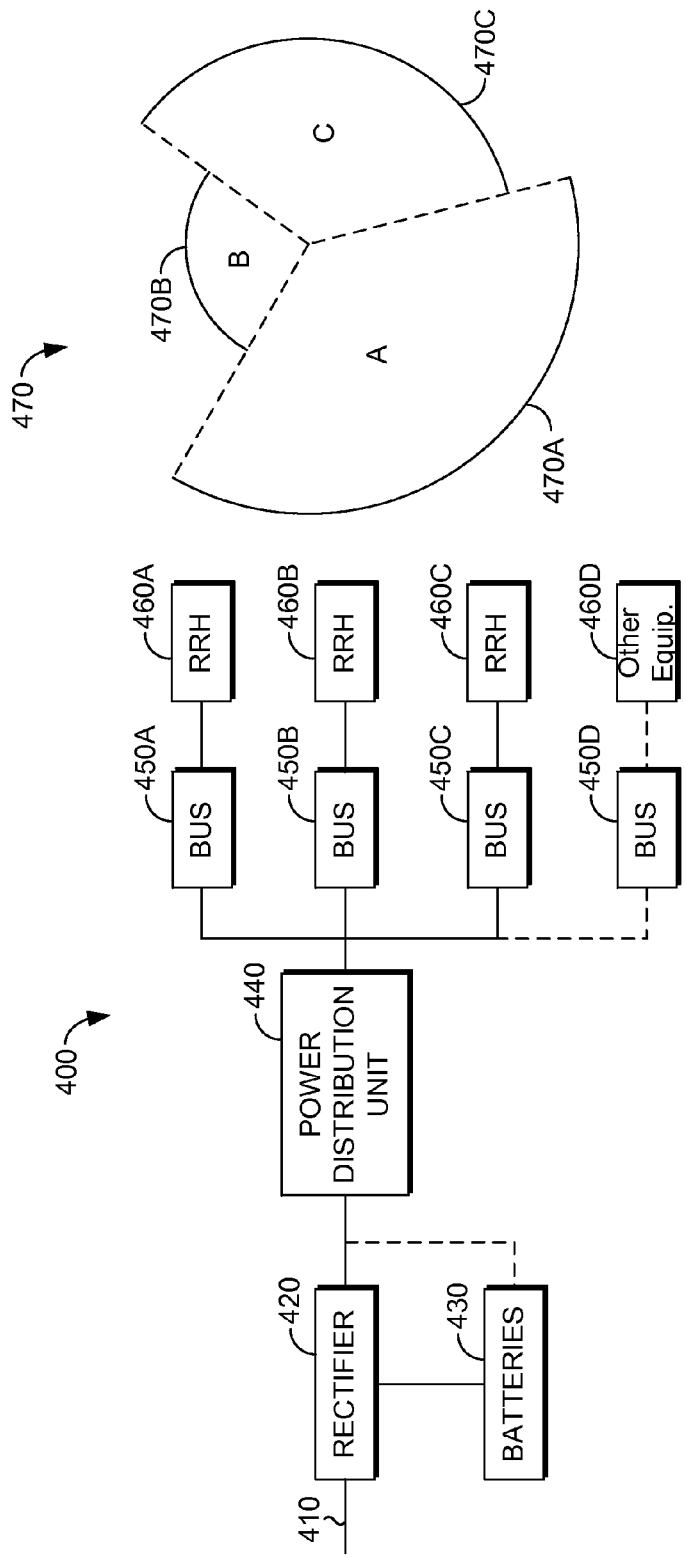
FIG. 4 is an exemplary block diagram illustrating power distribution among wireless network elements, implemented in accordance with an embodiment of the present invention.

Turning now to FIG. 4, an implementation of an embodiment of the present invention shows a network 400 that shows a power distribution flow from a source to a cell site. Network 400 is similar to network 300B with the exception that network 400 has more components to enable a variable power flow distribution. Under normal operating conditions, an AC power 410 flows into a rectifier 420. Rectifier 420 allows AC power 410 to be converted to DC power. In addition, rectifier 420 allows for a smooth transition to battery backup power with batteries 430 when AC power 410 is lost or removed. DC power will flow into power distribution unit 440. From power distribution unit 440, the DC power flows into buses 450A, 450B, and 450C, which distribute power respectively to RRHs 460A, 460B, and 460C. Buses 450A, 450B, and 450C can individually receive different power separate from each other. As a result, RRHs 460A, 460B, and 460C receive different power.

As in FIG. 3B, batteries 430 typically have four battery strings to allow for four (4) hours of battery backup. The DC power that flows from batteries 430 into power distribution unit 440 is distributed to buses 450A, 450B, and 450C based on the individual need of each bus. As the power is distributed from buses 450A, 450B, and 450C to RRHs 460A, 460B, and 460C, a cell site 470 shows a distribution of wireless coverage among sectors 470A, 470B, and 470C based on the power output at RRHs 460A, 460B, and 460C. Because the power output to each bus and corresponding RRH varies, the size of each sector varies as shown in FIG. 4 indicating different power usage in each sector. For example, a larger amount of power to RRH 460A results in a very large transmission area for sector 470A in comparison to the smaller power input into RRHs 460B and 460C, which show smaller sectors 470B and 470C.

A value in having a variable power distribution allows for power to be distributed and used more efficiently despite a limited battery backup resource. So, even if a set of battery strings can only provide four (4) hours of battery power, the power can be distributed to devices or areas that have the most need. For example, sector 470A may have a large number of mobile devices and require a significant amount of power for wireless transmission and coverage. On the contrary, sector 470B may transmit in an area that has a physical obstructions that does not require a lot of power or can only handle a restricted number of mobile devices. As a result, the power that ordinarily would be sent to bus 450B and RRH 460B can be reduced. In turn, the power to bus 450A and RRH 460A can be increased. The four (4) hours of battery backup can be used more strategically and efficiently to satisfy user demand.

The individual power requirement to each bus is determined by a feedback mechanism. In an implementation of an embodiment of the present invention, an eNodeB collects operational measurements of the cell site. For example, the eNodeB can collect data on the number of remote radio connections that occur in each sector. The number of remote radio connections in sectors 470A, 470B, and 470C can have an impact on the power usage in each sector. RRHs must have the ability to communicate with mobile devices as well as extend coverage if necessary over a particular area. Further, the eNodeB can collect data on the number of access attempts made by mobile devices in a particular sector. If more mobile devices attempt to have an access in a particular sector, the eNodeB can send information to the power distribution unit 440 or bus 450A, 450B, or 450C to adjust the power to accommodate the mobile devices in the particular sector. Likewise, the eNodeB can send information to adjust the power needs to the RRHs based on the remote radio connections.

Even though the feedback mechanism was discussed for remote radio connections and access attempts, other embodiments can be implemented that take into account other operational metrics. Depending on the preference of a service provider, other metrics can be used to provide feedback to elements to enable the power output from batteries 430 to be distributed to buses 450A, 450B, and 450C. As an example, voltage float levels can be monitored and voltage/ampere measurements can be taken. Based on the voltage/ampere measurements, the required power can be distributed from the proper battery string using digital logic controls. In other words, although there are four (4) battery strings, a subset of battery strings can be used. Timers as well as digital logic can be used with a lookup voltage/ampere table to determine the amount of power required from a battery string. Based on the amount of power that is required, digital logic can be used to combine parallel battery strings to provide the power that is needed to accommodate the most mobile devices.

Continuing with FIG. 4, the discussion in network 400 focused mainly on the use of buses to provide variable power to remote radio heads. However, one of ordinary skill in the art knows that other devices require power in an eNodeB or wireless network. Network 400 specifically discussed variable power that is sent to RRHs 460A, 460B, and 460C because these devices are the most critical and the most power consuming devices in the network. However, an implementation of an embodiment of the present invention can account for other devices. For example, other equipment 460D can receive power through a bus 450D. Therefore, in an embodiment, RRH 460A, 460B, or 460C can respectively have a dedicated bus 450A, 450B, or 450C, while other equipment 460D can receive power through bus 450D. As a result, rather than wasting power that can only be sent to all devices equally, buses 450A, 450B, 450C, and 450D can distribute power on a variable basis using the feedback mechanism provided by the operational measurements captured by the eNodeB.

Figure 5:
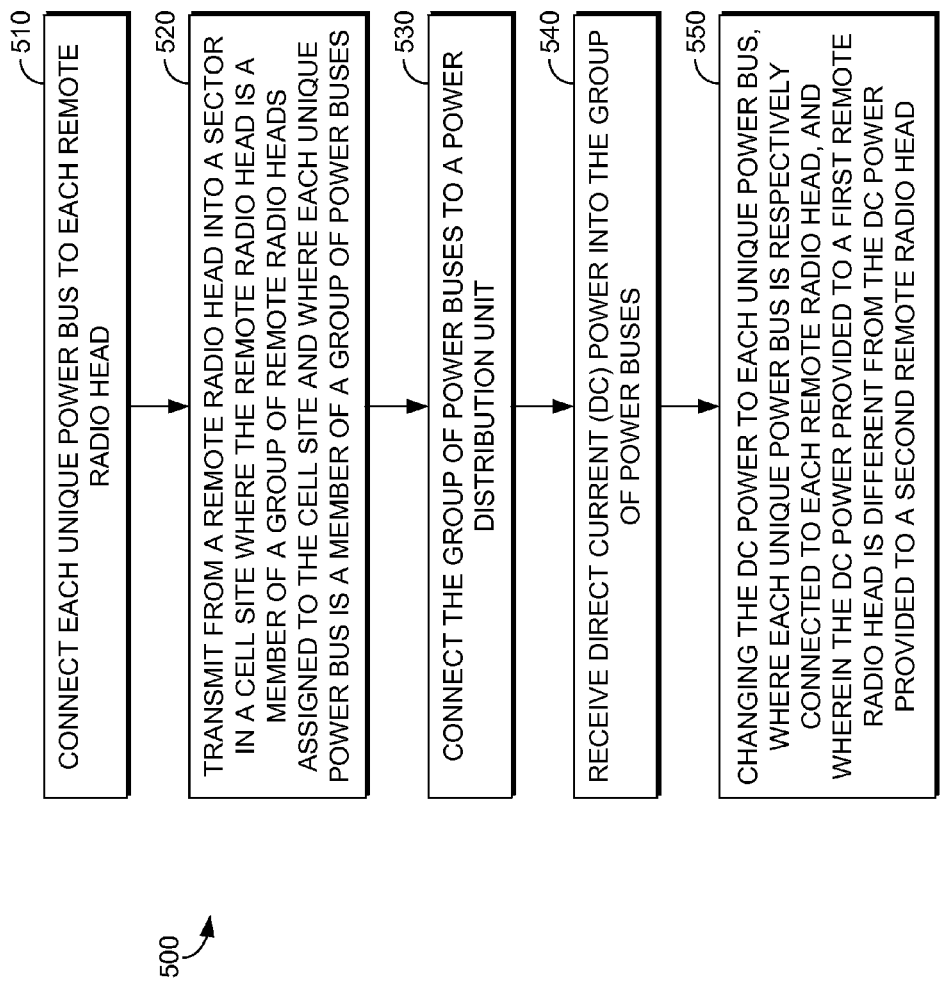
FIG. 5 is a process for adjusting power distribution to remote radio heads in a telecommunication network, implemented in accordance with an embodiment of the present invention.

Turning now to FIG. 5, a process for adjusting power distribution to remote radio heads in a telecommunication network is provided in a method 500. In a step 510, power buses 450A, 450B, and 450C are respectively connected to RRHs 460A, 460B, and 460C. In a step 520, RRH 460A transmits power into sector 470A in cell site 470. RRH 460A is a member of a group of remote radio heads assigned to cell site 470, such as RRHs 460A, 460B, and 460C. Likewise, buses 450A, 450B, 450C, and 450D are members of a group of power buses. The group of power buses are connected to power distribution unit 440, in a step 530. However, it is noted that in other implementations of embodiments of the present invention, buses 450A, 450B, 450C, and 450D can be integrated with power distribution unit 440. In a step 540, variable DC power is received into power buses 450A, 450B, 450C, and 450D. In a step 550, the DC power is changed to each power bus 450A, 450B, 450C, or 450D. Buses 450A, 450B, and 450C are respectively connected to RRHs 460A, 460B, and 460C. As a result, the DC power provided to RRH 460A is different from the DC power provided to RRH 460B. Similarly, the DC power provided to either RRH 460A or RRH 460B is different from the DC power provided to RRH 460C.

Figure 6:
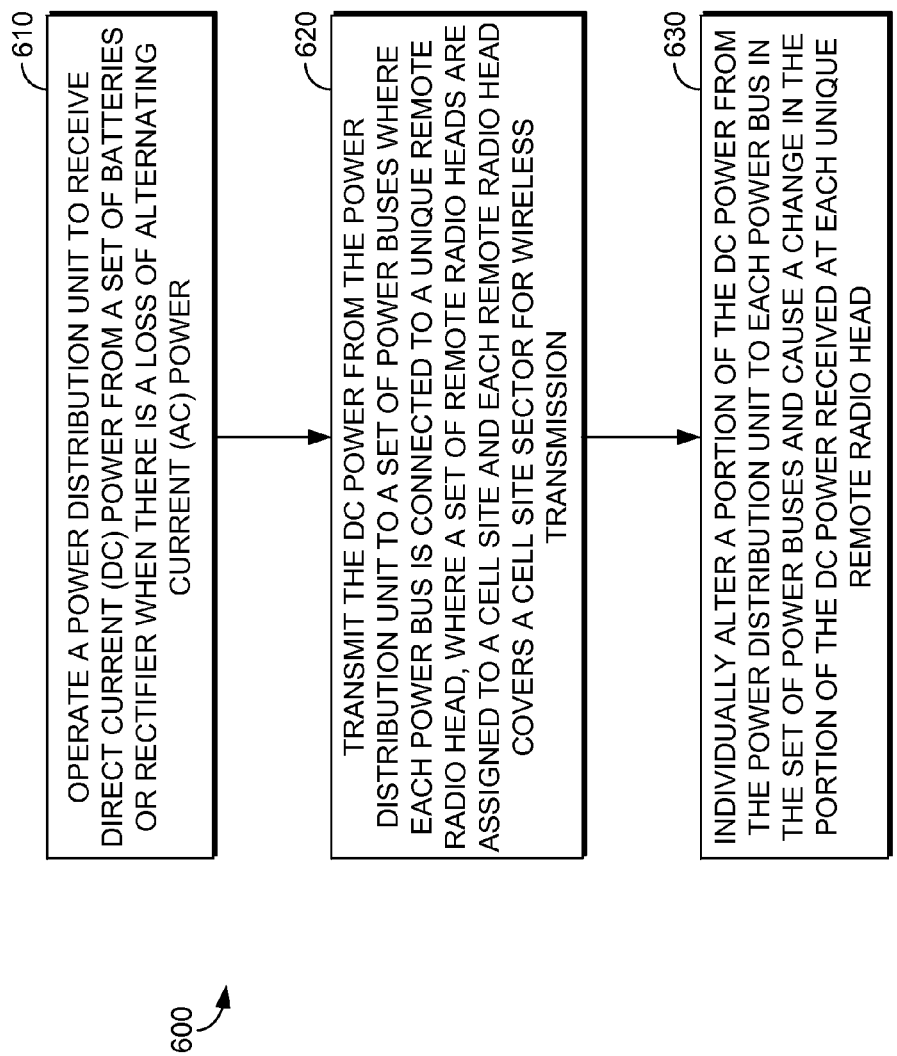
FIG. 6 is another process for adjusting power distribution to remote radio heads in a telecommunication network, implemented in accordance with an embodiment of the present invention.

In FIG. 6, another process for adjusting power distribution to remote radio heads in a telecommunication network is provided in a method 600. In a step 610, power distribution unit 440 receives DC power from batteries 430 or rectifier 420 when there is a loss of AC power 410. In a step 620, DC power is transmitted from power distribution unit 440 to power buses 450A, 450B, and 450C. Each power bus is respectively connected to RRHs 460A, 460B, and 460C. In turn, RRHs 460A, 460B, and 460C are assigned to cell site 470 where RRHs 460A, 460B, and 460C respectively cover sectors 470A, 470B, and 470C for wireless transmission. In a step 630, a portion of the DC power is altered from power distribution unit 440 to each power bus 450A, 450B, or 450C. The alteration of the DC power causes a change in the DC power received at each RRH 460A, 460B, or 460C.

Although not shown, many of the elements in FIGS. 3 and 4 are incorporated into network devices such as an eNodeB, nodeB, or BTS. For example, an eNodeB is composed of a baseband unit. The eNodeB may also include remote radio heads in some configurations. Typically, the baseband unit and remote radio heads are connected with an optical interface that meets the common public radio interface (CPRI) standard. The baseband unit includes the power distribution unit and buses that provide power to the remote radio heads. The idea here is to mention and acknowledge that the baseband unit is involved in the signal processing and power distribution although the unit is not specifically illustrated. Instead, the elements within the baseband unit have been discussed.

Many different arrangements of the various components depicted, as well as components not shown, are possible without departing from the spirit and scope of embodiments of the present invention. Embodiments of the present invention have been described with the intent to be illustrative rather than restrictive. Certain features and subcombinations are of utility and may be employed without reference to other features and subcombinations and are contemplated to be within the scope of the claims.

The invention claimed is:

1. A method for adjusting power distribution to remote radio heads in a telecommunication network, comprising:
   connecting each unique power bus to each remote radio head, wherein each remote radio head transmits in a sector in a cell site and is a member of a group of remote radio heads assigned to the cell site, and wherein each unique power bus is a member of a group of power buses;
   connecting the group of power buses to a power distribution unit;
   receiving direct current (DC) power into the group of power buses; and
   changing the DC power to each unique power bus, where each unique power bus is respectively connected to each remote radio head, and wherein the DC power provided to a first remote radio head is different from the DC power provided to a second remote radio head.

2. The method of claim 1, wherein connecting the group of power buses to the power distribution unit comprises integrating the group of power buses into the power distribution unit.

3. The method of claim 2, wherein receiving the DC power comprises receiving the DC power from a least one of a set of batteries or a rectifier connected to the set of batteries.

4. The method of claim 3, wherein changing the DC power to each unique power bus comprises allocating unique DC power from the set of batteries to each unique power bus.

5. The method of claim 4, further comprising receiving instructions from an evolved node B (eNodeB) to change the DC power sent to a particular power bus connected to a particular remote radio head, wherein the instructions are created based on operational measurement of the cell site collected by the eNodeB.

6. The method of claim 5, wherein the operational measurements include remote radio connections and access attempts of mobile device.

7. A system for adjusting power distribution to remote radio heads in a telecommunication network, comprising:
   a power distribution unit operable to receive direct current (DC) power from a set of batteries or rectifier when there is a loss of alternating current (AC) power;
   the power distribution unit transmits the DC power to a set of power buses where each power bus is connected to a unique remote radio head, wherein a set of remote radio heads are assigned to a cell site and each remote radio head covers a cell site sector for wireless transmission; and
   the power distribution unit individually alters a portion of the DC power to each power bus in the set of power buses and causes a change in the portion of the DC power received at each unique remote radio head.

8. The system of claim 7, wherein the set of power buses are integrated into the power distribution unit.

9. The system of claim 7, further comprising the power distribution unit is connected to an evolved node B (eNodeB) to receive operational instructions to change the portion of the DC power sent to each power bus.

10. The system of claim 9, wherein for the cell site, the DC power is uniquely allocated to each remote radio head through each power bus based on an operational performance of each cell site sector in the cell site.

11. The system of claim 10, wherein the operational performance of each cell site sector includes remote radio connections and access attempts of mobile devices.

12. A system for adjusting power distribution to remote radio heads in a telecommunication network, comprising:
   a power bus connects to a remote radio head, wherein the remote radio head transmits in a sector in a cell site and is a member of a group of remote radio heads assigned to the cell site, and wherein the power bus is a member of a group of power buses;
   the group of power buses connects to a power distribution unit and receives direct current (DC) power; and
   the power bus receives a change in the DC power, wherein the power bus in the group of power buses is respectively connected to the remote radio head in the group of remote radio heads, and wherein the DC power provided to a first remote radio head is different from the DC power provided to a second remote radio head.

13. The system of claim 12, wherein the group of power buses is integrated into the power distribution unit.

14. The system of claim 13, wherein the power bus receives the DC power from a least one of a set of batteries or a rectifier connected to the set of batteries.

15. The system of claim 14, wherein the power bus receives the change in the DC power comprises the power bus receives an allocation of the DC power from the set of batteries.

16. The system of claim 15, further comprising a particular power bus connected to a particular remote radio head receives instructions from an evolved node B (eNodeB) to change the DC power, wherein the instructions are created based on operational measurement of the cell site collected by the eNodeB.

17. The system of claim 16, wherein the operational measurements include remote radio connections and access attempts of mobile device.

* * * * *